United States Patent [19]

Soneda et al.

[11] Patent Number: 4,591,916
[45] Date of Patent: May 27, 1986

[54] SOLID STATE IMAGE PICKUP DEVICE

[75] Inventors: Mitsuo Soneda, Zana; Toshikazu Maekawa, Ebina; Takaji Ohtsu, Hatano, all of Japan

[73] Assignee: Sony Corporation, Tokyo, Japan

[21] Appl. No.: 557,180

[22] PCT Filed: Mar. 31, 1983

[86] PCT No.: PCT/JP83/00100
§ 371 Date: Nov. 25, 1983
§ 102(e) Date: Nov. 25, 1983

[87] PCT Pub. No.: WO83/03514
PCT Pub. Date: Oct. 13, 1983

[51] Int. Cl.[4] .............................. H04N 3/14
[52] U.S. Cl. ..................... 358/213; 357/24
[58] Field of Search ............ 358/213, 212, 209; 357/241 R

[56] References Cited
U.S. PATENT DOCUMENTS

4,209,806  6/1980  Koike et al. .................. 358/213
4,323,912  4/1982  Koike et al. .................. 357/24 LR Primary Examiner—Gene Z. Rubinson
Assistant Examiner—Stephen Brinich
Attorney, Agent, or Firm—Hill, Van Santen, Steadman & Simpson

[57] ABSTRACT

A solid state image pickup device comprises first switching elements ($S'_{11}$ to $S'_{mn}$) arrayed in horizontal and vertical rows and composed of a plurality of P-channel insulated-gate field-effect transistors, the first switching elements in each vertical row having one terminals connected in common, a photoelectric transducer layer (17) disposed over the horizontal and vertical rows of the first switching elements ($S'_{11}$ to $S'_{mn}$) and electrically connected to other terminals of the first switching elements ($S'_{11}$ to $S'_{mn}$), and a plurality of second switching elements ($T_1$ to $T_n$) disposed respectively for the vertical rows of the first switching elements ($S'_{11}$ to $S'_{mn}$) and connected respectively to the one terminals connected in common of the first switching elements in the respective vertical rows, with the arrangement thereof wherein the horizontal rows of the first switching elements ($S'_{11}$ to $S'_{mn}$) are selectively energizable and the second switching elements ($T_1$ to $T_n$) are selectively energizable to deliver signals based on signal charges generated by the photoelectric conversion layer (17) through the first and second switching elements ($S'_{11}$ to $S'_{mn}$, $T_1$ to $T_n$) so as to produce an image pickup signal output.

5 Claims, 10 Drawing Figures

SOLID STATE IMAGE PICKUP DEVICE

TECHNICAL FIELD

This invention relates to a solid state image pickup device having an image pickup surface comprising a matrix of two-dimensionally arrayed image pickup picture units each comprising, in combination, a photoelectric transducer and a switching element, and more particularly to a solid state image pickup device in which the photoelectric transducer in each image pickup element on the image pickup surface is composed of a photoelectric conversion layer capable of generating electrons as a signal charge and an image pickup signal output produced in response to the signal charge generated by the photoelectric conversion layer is delivered out through the switching element.

TECHNICAL BACKGROUNG

There has been proposed a solid state image pickup apparatus comprising, as main components, a solid state image pickup device having an image pickup surface composed of a prescribed pattern, such as a matrix for example, of two-dimensionally arrayed image pickup elements each comprising a photoelectric transducer and a switching element, and a scanning circuit for selectively energizing the switching elements of the solid state image pickup device to deliver an image pickup signal output based on a signal charge produced by the photoelectric transducer of each image pickup element. In the solid state image pickup device employed in such a solid state image pickup apparatus, each switching element is composed of an insulated-gate field-effect transistor (hereinafter referred to as a "MOS FET"), and the photoelectric transducers are composed of a plurality of photodetecting diodes provided respectively for the switching elements or a thin photoelectric conversion layer disposed over the two-dimensional array of the switching elements.

Figure 1:
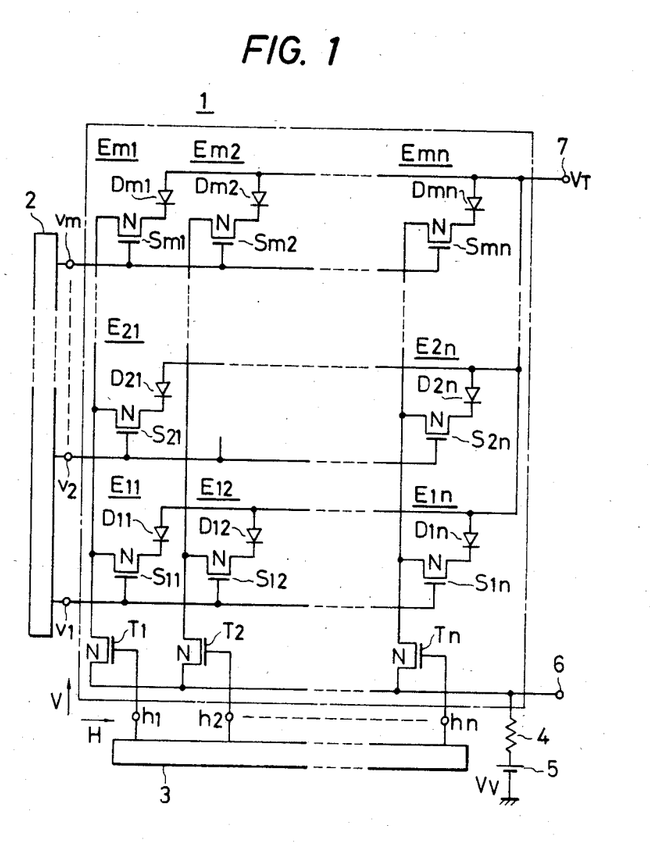
FIGS. 1 abd 2 are equivalent circuit diagrams schematically showing a conventional solid state image pickup device and its peripheral circuits.

FIG. 1 shows an equivalent circuit of the solid state image pickup device that has heretofore been proposed, and a scanning circuit and an output circuit which are required for putting the solid state image pickup device into operation. The solid state image pickup device, generally designated at 1, is composed of N-channel MOS FETs $S_{11}$ to $S_{mn}$ serving as switching elements, respectively, and arrayed as a matrix in horizontal rows (in the direction of an arrow H) and in vertical rows (in the direction of an arrow V), and photoelectric transducers $D_{11}$ to $D_{mn}$ each connected to one end, for example, a source of the corresponding one of the MOS FETs $S_{11}$ to $S_{mn}$. These MOS FETs $S_{11}$ to $S_{mn}$ and photoelectric transducers $D_{11}$ to $D_{mn}$ from an image pickup surface. Each combination of one of the N-channel MOS FETs $S_{11}$ to $S_{mn}$ and one of the photoelectric transducers $D_{11}$ to $D_{mn}$ forms one of image pickup picture units $E_{11}$ to $E_{mn}$.

The gates of the N-channel MOS FETs $S_{11}$ to $S_{mn}$ which constitutes the image pickup picture units $E_{11}$ to $E_{mn}$ are connected in common in each horizontal row, and groups of the gates connected in common are coupled respectively to m control terminals $v_1$ to $v_m$ which are supplied with vertical scanning signals from a vertical scanning circuit 2. The drains of the N-channel MOS FETs $S_{11}$ to $S_{mn}$ are connected in common in each vertical row, and groups of the drains connected in common are coupled to the sources, respectively, of N-channel MOS FETs $T_1$ to $T_n$ serving as switching elements. The N-channel MOS FETs $T_1$ to $T_n$ have their gates connected respectively to n control terminals $h_1$ to $h_m$ which are supplied with horizontal scanning signals from a horizontal scanning circuit 3. The drains of the N-channel MOS FETs $T_1$ to $T_n$ are connected in common through an output resistor 4 to a power supply 5 which supplies an operation voltage $V_V$. An output terminal 6 is led from a junction between the drains of the N-channel MOS FETs $T_1$ to $T_n$ connected in common and the output resistor 4.

The vertical scanning circuit 2 includes a shift register, for example, for issuing vertical scanning signals through the m control terminals $v_1$ to $v_m$ to the gates of the MOS FET $S_{11}$ to $S_{mn}$ to successively energize the rows of the MOS FET $S_{11}$ to $S_{mn}$. The horizontal scanning circuit 3 includes a shift register, for example, for issuing horizontal scanning signals having a frequency sufficiently higher than that of the vertical scanning signals from the vertical scanning circuit 2 through the n control terminals $h_1$ to $h_n$ to the gates of the MOS FETs $T_1$ to $T_n$ to successively energize the MOS FETs $T_1$ to $T_n$.

The ends of the photoelectric transducers $D_{11}$ to $D_{mn}$ remote from the sources of the MOS FETs $S_{11}$ to $S_{mn}$ are connected in common to an output terminal 7 to which a predetermined voltage $V_T$ is applied.

Figure 2:
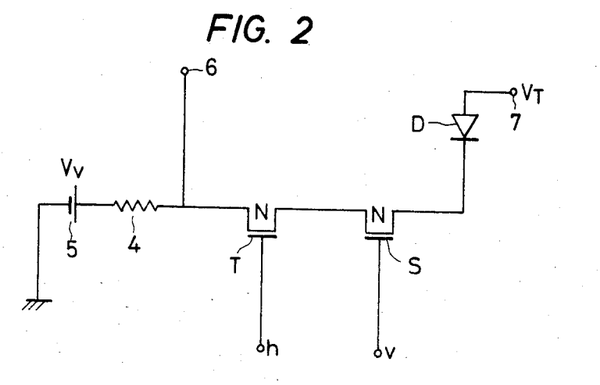

Any desired one E of the image pickup picture units $E_{11}$ to $E_{mn}$ of the solid state image pickup device 1 thus constructed and a corresponding one T of the MOS FETs $T_1$ to $T_n$ are connected as shown in FIG. 2. More specifically, the image pickup picture unit E has a photoelectric transducer D and an N-channel MOS FET S, and the photoelectric transducer D has one terminal connected to the source of the MOS FET S. The drain of the MOS FET S is connected to the source of the N-channel MOS FET T having a drain connected to the output terminal 6 and through the output resistor 4 to the power supply 5. The other terminal of the photoelectric transducer D is connected to the terminal 7 for being supplied with the voltage $V_T$. The gate of the MOS FET S is connected to one v of the control terminals $v_1$ to $v_m$, while the gate of the MOS FET T is connected to one h of the control terminals $h_1$ to $h_n$.

Figure 3:
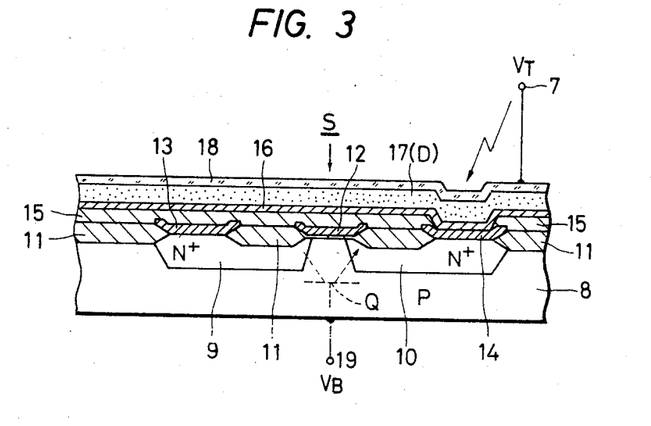
FIG. 3 is a cross-sectional view illustrating a specific construction of a portion of the solid state image pickup device shown in FIG. 1.

A specific construction of the image pickup picture unit E thus connected is illustrated in FIG. 3 by way of example. FIG. 3 shows a cross section of an area where the image pickup picture unit E is formed in a specific construction of the image pickup device 1. Two independent N-type regions are formed in a P-type semiconductor substrate 8, and a gate electrode 12 is disposed between and extends partly over the N-type regions with an insulating layer 11 interposed between the gate electrode 12 and the P-type semiconductor substrate 8, thus forming an N-channel MOS FET S with these N-type regions serving respectively as a drain 9 and a source 10. A drain electrode 13 for the MOS FET S is provided on the drain 9, and a source electrode 14 for the MOS FET S is provided on the source 10.

Over the area in which the MOS FET S is thus formed, there is placed an insulating layer 15 except for the source electrode 14, and the insulating layer 15 is covered with an electrode 16 composed of an aluminum layer, for example, connected to the source electrode 14. A photoelectric conversion layer 17 formed with a thin amorphous silicon film is deposited over the electrode 16. A transparent electrode (target electrode) 18 is formed on the photoelectric conversion layer 17. The photoelectric conversion layer 17 spreading over the area where the MOS FET S is formed includes a portion which serves as the photoelectric transducer D. Therefore, the photoelectric transducers $D_{11}$–$D_{mn}$ of the solid state image pickup device 1 are not constructed of independent photodetectors such as photodetecting diodes, but of respective areas of the photoelectric conversion layer 17 extending over the image pickup surface. Light falls on the image pickup surface through the target electrode 18.

The semiconductor substrate 8 is supplied with a substrate voltage $V_B$ through a terminal 19, and the target electrode 18 is supplied with the voltage (target voltage) $V_T$ from the terminal 7.

Whe light from an object falls on the image pickup picture units $E_{11}$ to $E_{mn}$ on the image pickup surface of the solid state image pickup device 1 thus constructed, the photoelectric transducers $D_{11}$ to $D_{mn}$ convert light energy into an electric charge which is dependent on quantities of incident light falling respectively on the image pickup picture units $E_{11}$ to $E_{mn}$. The electric charge is then stored in the respective sources of the MOS FETs $S_{11}$ to $S_{mn}$ as a signal charge. A signal based on the stored signal charge is delivered to the output terminal 6 to produce an image pickup signal output when the horizontal rows of the MOS FETs $S_{11}$ to $S_{mn}$ are selectively energized by the vertical scanning signals issued from the vertical scanning circut 2 and the MOS FETs $T_1$ to $T_n$ are selectively energized by the horizontal scanning signals issued from the horizontal scanning circuit 3.

Figure 4A:
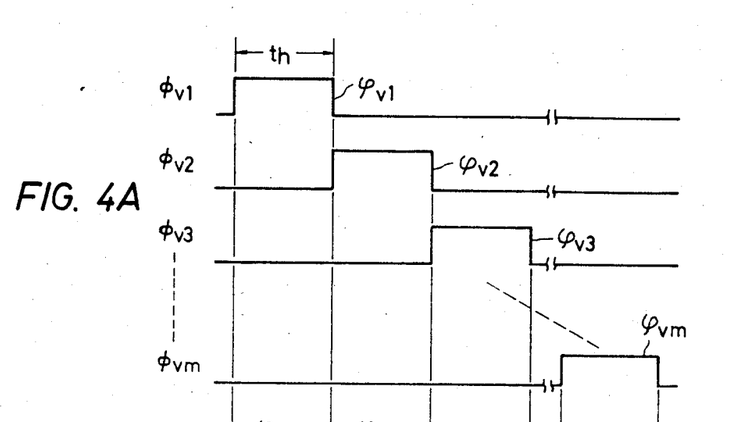
FIGS. 4A and 4B are waveform diagrams used for explaining the operation of the solid state image pickup device and the peripheral circuits shown in FIG. 1.
Figure 4B:
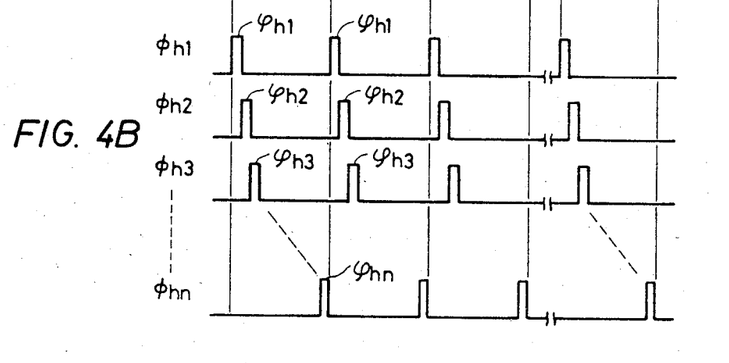

For such vertical and horizontal scanning operation, the vertical scanning circuit 2 supplies to the m control terminals $v_1$ to $v_m$ with vertical scanning signals $\Phi_{v1}$ to $\Phi_{vm}$, respectively, as shown in FIG. 4A, and the horizontal scanning circuit 3 supplies to the n control terminals $h_1$ to $h_n$ with horizontal scanning signals $\Phi_{h1}$ to $\Phi_{hn}$, respectively, as shown in FIG. 4B. More specifically, the vertical scanning signals $\Phi_{v1}$ to $\Phi_{vm}$ are composed of m pulses $\phi_{v1}$ to $\phi_{vm}$ which have a high level during a period $t_h$ corresponding to one horizontal period of a video signal and are generated successively in one vertical period. The horizontal scanning signals $\Phi_{h1}$ to $\Phi_{hn}$ are composed of n pulses $\phi_{h1}$ to $\phi_{hn}$ which have a high level in a short period and are generated successively in each period of each of the pulses $\phi_{v1}$ to $\phi_{vm}$ of the vertical scanning signals $\Phi_{v1}$ to $\Phi_{vm}$. The MOS FETs $S_{11}$ to $S_{mn}$ and $T_1$ to $T_n$ are energized when their gates are supplied with the pulses $\phi_{v1}$ to $\phi_{vm}$ of the vertical scanning signals $\Phi_{v1}$ to $\Phi_{vm}$ and the pulses $\phi_{h1}$ to $\phi_{hn}$ of the horizontal scanning signals $\Phi_{h1}$ to $\Phi_{hn}$.

The pulse $\phi_{v1}$ of the vertical scanning signal $\Phi_{v1}$ delivered from the vertical scanning circuit 2 is first applied to the gates of the MOS FETs $S_{11}$ to $S_{1n}$ which constitute the first row to energize the MOS FETs $S_{11}$ to $S_{1n}$, whereupon a signal based on the signal charge stored in their sources is transmitted the sources of the MOS FETs $T_1$ to $T_n$, respectively. During the period of the pulse $\phi_{v1}$, the pulses $\phi_{h1}$ to $\phi_{hn}$ of the horizontal scanning signals $\Phi_{h1}$ to $\Phi_{hn}$ from the horizontal scanning circuit 3 are successively applied to the gates of the MOS FETs $T_1$ to $T_n$, respectively, to energize the MOS FETs $T_1$ to $T_n$, successively. A signal current based on the signal that has been transmitted to the sources of the MOS FETs $T_1$ to $T_n$ is now successively allowed to flow through the output resistor 4. As a consequence, the image pickup signal output produced by the image pickup picture units $E_{11}$ to $E_{1n}$ corresponding respectively to the MOS FETs $S_{11}$ to $S_{1n}$ becomes sequentially available from the output terminal 6.

Then, the pulse $\phi_{v2}$ of the vertical scanning signal $\Phi_{v2}$ is supplied to the gates of the MOS FETs $S_{21}$ to $S_{2n}$ which constitute the next row to energize these MOS FETs $S_{21}$ to $S_{2n}$, and the MOS FETs $T_1$ to $T_n$ are successively rendered conductive by the pulses $\phi_{h1}$ to $\phi_{hn}$ of the horizontal scanning signals $\Phi_{h1}$ to $\Phi_{hn}$. Therefore, image pickup signal output produced by the image pickup picture units $E_{21}$ to $E_{2n}$ corresponding respectively to the MOS FETs $S_{21}$ to $S_{2n}$ becomes sequentially available from the output terminal 6. Likewise, image pickup signal outputs produced by the successive image pickup picture units up to the image pickup picture units $E_{m1}$ to $E_{mn}$ corresponding respectively to the MOS FETs $S_{m1}$ to $S_{mn}$ become seqeuntially available from the output terminal 6 in the respective periods each equiavlent to one vertical period. The foregoing cycle of scanning operation will be repeated.

The storage of a signal charge in any desired one image pickup picture unit E on the image pickup surface of the foregoing prior solid state image pickup device 1 will be considered with reference to FIGS. 2 and 3. First, the MOS FET S and the MOS FET T are turned on to deliver an image pickup signal output from the image pickup picture unit E, and thereafter the MOS FET S and the MOS FET T are turned off again. At this time, the capacitance associated with the drain 9 and source 10 of the MOS FET S is charged by the operation voltage $V_V$ from the power supply 5, and the potential at the drain 9 and source 10 of the MOS FET S is $V_V$. Under this condition, electrons generated by an electric charge produced by incident light in the photoelectric conversion layer 17 which forms the photoelectric transducer D are collected into the source 10 under an electric field caused between the source 10 and the target electrode 18 kept at the potential $V_T$ by being supplied with the target voltage $V_T$, whereupon the potential of the source 10 is lowered. The signal charge is thus stored in the source 10 of the MOS FET S.

The potential of the source 10 can be lowered down to the potential $V_T$ of the target electrode 18. When the potential of the source 10 becomes lower than the potential $V_B$ of the semiconductor substrate 8 supplied with the substrate voltage $V_B$, a parasitic NPN transistor Q formed jointly by the semiconductor substrate 8, the drain 9 and the source 10 as shown by the dotted line in FIG. 3 is rendered conductive so as to allow the signal charge in the source 10 to flow through the parasitic NPN transistor Q into the drain 9. The signal based on the signal charge which has thus entered the drain 9 is an unwanted signal which will be mixed with image output signals from other image pickup picture units and disadvantageous in that it will cause a phenomenon known as blooming. Such would be prevented by selecting a voltage setting as the operation voltage $V_V$ of the power supply 5 > the target voltage $V_T$ > the substrate voltage $V_B$. However, such a voltage setting is not preferred since the potential difference $(V_V - V_T)$ applied to the photoelectric conversion layer 17 would be small, resulting in a lower photoelectric conversion efficiency and a poorer sensitivity.

With the foregoing arrangement, therefore, the signal charge can be stored until the potential of the source 10 is equal to the potential $V_B$ of the semiconductor substrate 8, and the output dymanic range becomes $V_V - V_B$. Widening of the output dynamic range would be achieved by increasing the operation voltage $V_V$ of the power supply 5. If the operation voltage $V_V$ were increased, then it would be necessary to increase the amplitude of the vertical scanning signal to be applied to the gate of the MOS FET S to turn on the latter. This would be difficult to accomplish in view of the potential durability of the MOS FET S and a greater burden on the vertical scanning circuit. Consequently, the output dynamic range cannot be widened.

Leakage of the incident light causes electrons resulting from an electric charge generated in the semiconductor substrate 8 to flow into the source and drain of the MOS FET of a nearby image pickup picture unit having a high potential, with a resulting image smearing phenomenon.

The conventional solid state image pickup device 1 described above is therefore disadvantageous in that it suffers from blooming and image smearing, and the output dymanic range cannot be increased.

DISCLOSURE OF THE INVENTION

With the foregoing difficulties in view, it is an object of the present invention to provide a solid state image pickup device having photoelectric transducers provided in respective image pickup picture units on an image pickup surface and formed with a photoelectric conversion layer for generating electrons as signal charge in response to light falling thereon and switching elements composed of P-channel MOS FETs and cooperating with the photoelectric transducers in forming the image pickup picture units, which is free from the above prior disadvantages, capable of reducing the amplitude of scanning signals, and having increased design flexibility.

The solid state image pickup device according to the present invention comprises first switching elements arrayed in horizontal and vertical rows and composed of a plurality of P-channel MOS FETs, the first switching elements in each vertical row having one terminal connected in common, a photoelectric conversion layer disposed over the horizontal and vertical rows of the first switching elements and electrically connected to other terminals of the first switching elements for generating electrons as a signal charge in response to light falling thereon, and a plurality of second switching elements disposed respectively for the vertical rows of the first switching elements and connected respectively to the one terminals connected in common of the first switching elements in the respective vertical rows, with the arrangement there of in which the horizontal rows of the first switching elements are selectively energizable and the second switching elements are selectively energizable to deliver a signal based on the signal charge generated by the photoelectric conversion layer through the first and second switching elements so as to produce an image pickup signal output.

With the solid state image pickup device of the invention thus constructed, the photoelectric transducers are formed with the photoelectric conversion layer for generating electrons as signal change in response to light falling thereon, and the switching elements which cooperate with the photoelectric transducers in forming image pickup picture units are constructed of the P-channel MOS FETs. The solid state image pickup device thus constituted is free from blooming and image smearing, and has an output dynamic range much larger than that of the conventional solid state image pickup device. In addition, the solid state image pickup device of the invention can reduce the amplitude of scanning signals, that is, vertical scanning sginals, for turning on and off the switching elements which constitute the respective image pickup picture units. The solid state image pickup device according to the present invention also has various advantages which will become clear as the following description proceeds, and is capable of producing image pickup signal output of good quality while reducing the burden on the scanning circuit.

AN EMBODIMENT MOST PREFERABLE FOR WORKING OF THE INVENTION

A most preferable embodiment of the present invention will be described with reference to FIGS. 5 through 8.

Figure 5:
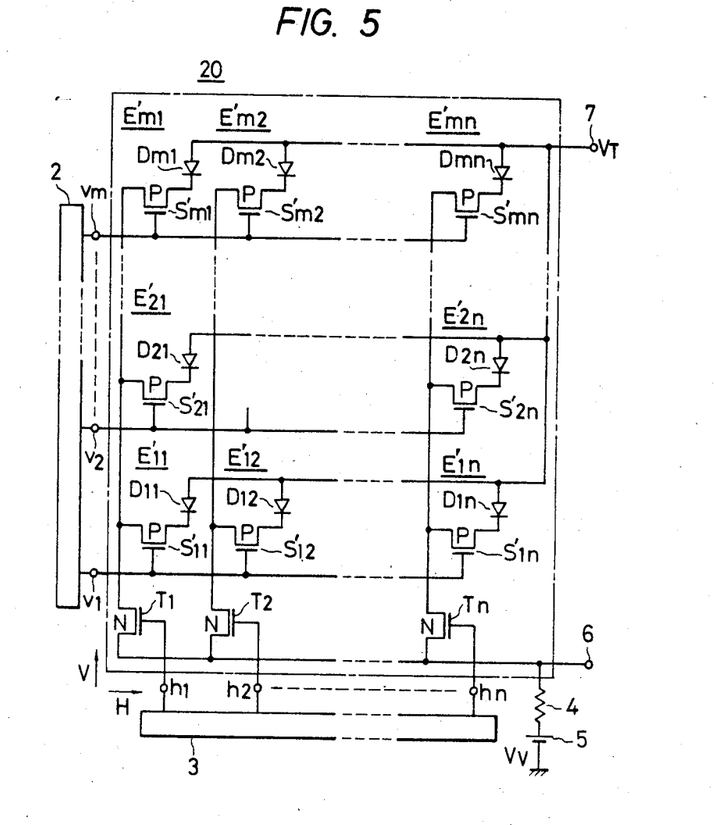
FIGS. 5 and 6 are equivalent circuit diagrams schematically showing a solid state image pickup device according to the present invention and its peripheral circuits.

FIG. 5 shows an equivalent circuit of a solid state image pickup device according to the present invention and scanning and output circuits necessary for putting the solid state image pickup device into operation. Parts shown in FIG. 5 which correspond to those in FIG. 1 are marked with the same references and further description thereof will be omitted. The solid state image pickup device according to the present invention, which is generally designated at 20, has an image pickup surface composed of image pickup picture units $E_{11}'$ to $E_{mn}'$ arrayed in the same manner as that of the image pickup picture units $E_{11}$ to $E_{mn}$ in the solid state image pickup device 1 illustrated in FIG. 1. Each of the image pickup picture units $E_{11}'$ to $E_{mn}'$ is composed of one of photoelectric transducers $D_{11}$ to $D_{mn}$ and one of P-channel MS FETs $S_{11}'$ to $S_{mn}'$ have drains connected respectively to the photoelectric transducers $D_{11}$ to $D_{mn}$. The gates of the MOS FETs $S_{11}'$ to $S_{mn}'$ in respective horizontal rows are connected in common to control terminals $v_1$ to $v_m$, respectively, and the sources of the MOS FETs $S_{11}'$ to $S_{mn}'$ in respective vertical rows are connected in common to the sources, respectively, of N-channel MOS FETs $T_1$ to $T_n$. The other construction is the same as that of the solid state image pickup device 1 shown in FIG. 1.

Figure 6:
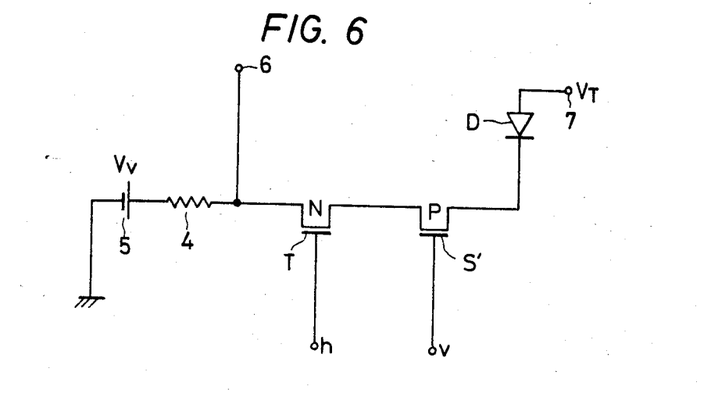

Any desired one E' of the image pickup picture units $E_{11}'$ to $E_{mn}'$ of the solid state image pickup device 20 according to the present invention is connected to a coresponding one T of the MS FETs $T_1$ to $T_n$ as shown in FIG. 6. More specifically, the image pickup picture unit E' is composed of a photoelectric transducer D and a P-channel MOS FET S', the photoelectric transducer D having one terminal connected to the drain of the MOS FET S'. To the source of the MOS FET S', there is connected the source of the N-channel MOS FET T with its drain connected to a power supply 5 through an output resistor 4 and to an output terminal 6. The other terminal of the photoelectric transducer D is coupled to a terminal 7 for being supplied with a voltage $V_T$. The MOS FET S' has a gate connected to one v of the control terminals $v_1$ to $v_m$, and the MOS FET T has a gate connected to one h of the control terminals $h_1$ to $h_n$.

Figure 7:
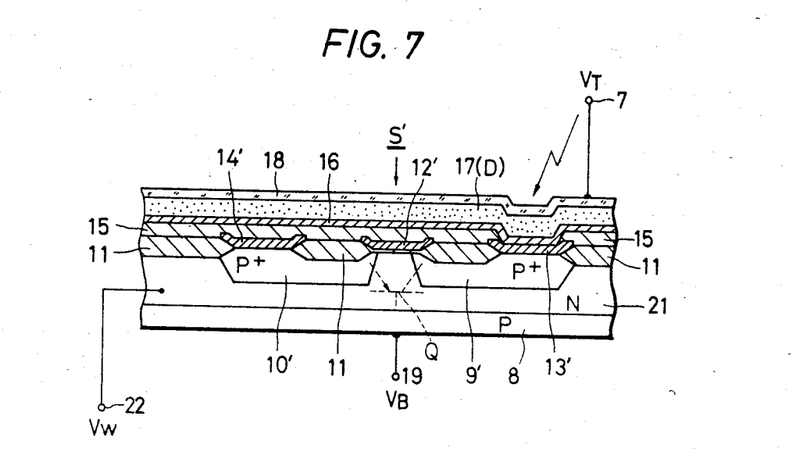
FIG. 7 is a cross-sectional view illustrating a specific construction of a portion of the solid state image pickup device of the invention shown in FIG. 5.

FIG. 7 shows, by way of example, a specific construction of the image pickup picture unit E' connected as above. FIG. 7 is illustrative of a cross section of an area where the image pickup picture unit E' is formed in a specific construction of the image pickup device 20. Parts shown in FIG. 7 which correspond to those in FIG. 3 are marked with the same references. An N-type well 21 comprising an N-type semiconductor region is formed in a P-type semiconductor substrate 8. Two independent P-type regions are formed in the N-type well 21, and a gate electrode 12' is disposed between and extends partly over the P-type regions with an insulating layer 11 interposed between the gate electrode 12' and the N-type well 21, thus forming an P-channel MOS FET S' with these P-type regions serving respectively as a drain 9' and a source 10'. A drain electrode 13' for the MOS FET S' is provided on the drain 9', and a source electrode 14' for the MOS FET S' is provided on the source 10'.

Over the area in which the MOS FET S' is thus formed, there is placed an insulating layer 15 except for the drain electrode 13', and the insulating layer 15 is covered with an electrode 16 composed of an aluminum layer, for example, connected to the drain electrode 13'. A photoelectric conversion layer 17 formed with a thin amorphous silicon film is deposited over the electrode 16 for generating electrons as a signal charge in response to light falling thereon. A transparent electrode (target electrode) 18 is formed on the photoelectric conversion layer 17. The photoelectric conversion layer 17 spreading over the area where the MOS FET S' is formed includes a portion which serves as the photoelectric transducer D. Therefore, the photoelectric transducers $D_{11}$-$D_{mn}$ of the solid state image pickup device 20 are not constructed of independent photodetectors such as photodetecting diodes, but of respective areas of the photoelectric conversion layer 17 extending over the image pickup surface on which light falls.

The semiconductor substrate 8 is supplied with a substrate voltage $V_B$ through a terminal 19, and the N-type well 21 is supplied with a well voltage $V_W$ through a terminal 22. The target electrode 18 is supplied with the voltage (target voltage) $V_T$ from the terminal 7. The well voltage $V_W$ is selected to be greater than the substrate voltage $V_B$ so that the junction between the N-type well 21 and the semiconductor substrate 8 will not be forward-biased.

When light from an object falls on the image pickup picture units $E_{11}'$ to $E_{mn}'$ on the image pickup surface of the solid state image pickup device 20 thus constructed, the photoelectric transducers $D_{11}$ to $D_{mn}$ convert light energy into an electric charge which is dependent on quantities of incident light falling respectively on the image pickup picture units $E_{11}'$ to $E_{mn}'$. The electric charge is then stored in the respective sources of the MOS FETs $S_{11}'$ to $S_{mn}'$ as a signal charge. A signal based on the stored signal charge is delivered to the output terminal 6 to produce an image pickup signal output when the horizontal rows of the MOS FETs $S_{11}'$ to $S_{mn}'$ are selectively energized by the vertical scanning signals issued from the vertical scanning circuit 2 and the MOS FETs $T_1$ to $T_n$ are selectively energized by the horizontal scanning signals issued from the horizontal scanning circuit 3.

Figure 8A:
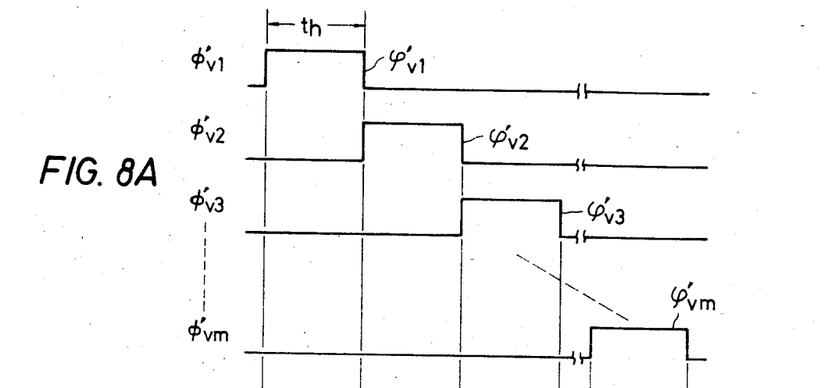
FIGS. 8A and 8B are waveform diagrams used for explaining the operation of the solid state image pickup device shown in FIG. 5.
Figure 8B:
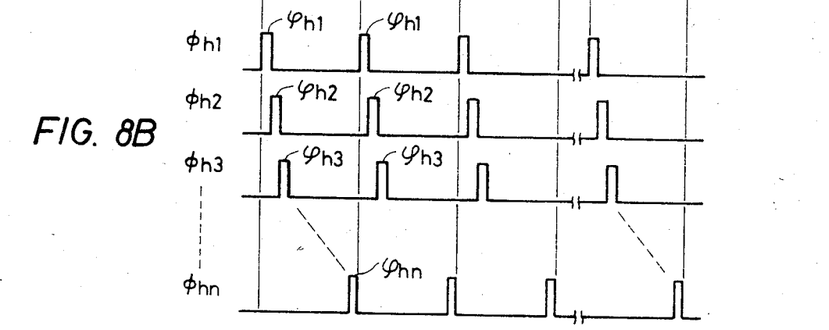

For such vertical and horizontal scanning operation, the vertical scanning circuit 2 supplies to the m control terminals $v_1$ to $v_m$ with vertical scanning signals $\Phi'_{v1}$ to $\Phi'_{vm}$, respectively, as shown in FIG. 8A. The vertical scanning signals $\Phi'_{v1}$ to $\Phi'_{vm}$ are composed of m pulses $\phi'_{v1}$ to $\phi'_{vm}$ which have a low level during a period $t_h$ corresponding to one horizontal period of a video signal and are generated successively in one vertical period. The horizontal scanning circuit 3 supplies to the n control terminals $h_1$ to $h_n$ with horizontal scanning signals $\Phi_{h1}$ to $\Phi_{hn}$, respectively, which are the same as those shown in FIG. 4B, as illustrated in FIG. 8B. The MOS FETs $S_{11}'$ to $S_{mn}'$ and $T_1$ to $T_n$ are energized when their gates are supplied with the low-level pulses $\phi'_{v1}$ to $\phi'_{vm}$ of the vertical scanning signals $\Phi'_{v1}$ to $\Phi'_{vm}$ and the high-level pulses $\phi_{h1}$ to $\phi_{hn}$ of the horizontal scanning signals $\Phi_{h1}$ to $\Phi_{hn}$. Accordingly, the image pickup signal output is delivered to the output signal 6 in the same manner as that in which the image pickup signal output is produced in the solid state image pickup device 1 shown in FIG. 1.

The storage of a signal charge in any desired one image pickup picture unit E' on the image pickup surface of the solid stage image pickup device 20 and the delivery of the signal based on the stored signal charge will be considered with reference to FIGS. 6 and 7. First, the MOS FET S' and the MOS FET T are turned on to deliver an image pickup signal output from the image pickup picture unit E', and thereafter the MOS FET S' and the MOS FET T are turned off again into an initial state. At this time, the capacitances accompanying the source 10' and the drain 9' of the MOS FET S' is charged by the operation voltage $V_V$ from the power supply 5, and the potential at the source 10' and the drain 9' of the MOS FET S' is $V_V$. Since the MOS FET S' is of the P-channel type, the operation voltage $V_V$ is set to be smaller than the well voltage $V_W$ so that the potential of the source 10' and the drain 9' is lower than the potential of the N-type well 21. Under this condition, electrons which are an electric charge produced by incident light in the photoelectric conversion layer 17 which forms the photoelectric transducer D are collected into the drain 9' under an electric field caused between the drain 9' and the target electrode 18 kept at the potential $V_T$ by being supplied with the target voltage $V_T$, whereupon the potential of the drain 9' is lowered below the voltage $V_V$. The signal charge is thus stored in the drain 9' of the MOS FET S'.

The potential of the drain 9' can be lowered down to the potential $V_T$ of the target electrode 18. As the signal charge is stored in the drain 9', the potential of the drain 9' becomes progressively lower than the potential of the N-type well 21. Therefore, a parasitic PNP transistor Q' which is constituted by the N-type well 21, the drain 9', and the source 10' as shown by the dotted line in FIG. 7 will never be rendered conductive. The signal charge stored in the drain 9' does not flow through the parasitic PNP transistor Q' into the source 10'. As a result, no blooming takes place. The potential difference between the drain 9' and the N-type well 21 is small when the quantity of incident light is small, and large when the quantity of incident light is large. Therefore, the dark current flowing while the quantity of incident light is low is extremely small, thus improving the signal-to-noise ratio of the image pickup signal output.

The potential difference between the drain 9' and the N-type well 21 to which the well voltage $V_W$ is applied has a maximum value of $V_W-V_T$. No problem occurs in respect of the potential durability of the MOS FET S' unless the above maximum potential difference exceeds a breakdown voltage $V_D$ of the PN junction between the drain 9' and the N-type well 21. Therefore, the voltages should be selected to meet the relationship: $V_W-V_T<V_D$, and hence $V_T>V_W-V_D$. Design flexibility can be increased since the target voltage $V_T$ can be selected in the range in which the above condition is met and also the condition $V_T<V_V$ for applying a predetermined voltage between the target electrode 18 and the drain 9' is met.

Since the potential of the drain 9' of the MOS FET S' is variable from $V_V$ to $V_T$, the output dynamic range is rendered large as it is equal to the range $V_V-V_T$.

The level of the vertical scanning signal to be applied to the gate of the MOS FET S' for energizing the latter to deliver the signal charge stored in the drain 9' of the MOS FET S' may be smaller than the difference $V_V-|V_{ths}|$ where $V_{ths}$ is the threshold voltage ($<0$) for the MOS FET S'. The capacitance accompanying the source 10' of the MOS FET S' is of a value much greater than that of the capacitance accompanying the drain 9' thereof. The potential of the source 10' therefore remains substantially unchanged when the signal charge stored in the drain 9' is moved at the time the MOS FET S' is turned on. With the potential of the source 10' being regarded as $V_V$ at all times, the level of the vertical scanning signal to be supplied to the gate of the MOS FET S' should be higher than the difference $V_V-|V_{ths}|$. This allows the amplitude of the vertical scanning signal for energizing and de-energizing the MOS FET S' to be relativley small.

When an electric charge of holes and electrons is generated in the N-type well 21 and the semiconductor substrate 8 due to leakage of the incident light, the holes drop into and are absorbed by the semiconductor substrate 8, and the electrons are absorbed by the N-type well 21. Since almost no holes and electrons flow into the drain and source of the MOS FET of a nearby image pickup picture unit, no image smearing occurs.

The level of the horizontal scanning signal to be applied to the gate of the N-channel MOS FET T for energizing the latter to deliver the signal from the MOS FET S' may be smaller than the sum $V_V+V_{thT}$ where $V_{thT}$ is the threshold voltage ($>0$) for the MOS FET T in case the MOS FET T is of the enhancement mode. Where the MOS FET T is of the depletion mode, its threshold voltage $V_{thT}'$ is the negative, and the level of the horizontal scanning signal to be applied to the gate of the MOS FET T for turning on the MOS FET T may be smaller than that for the enhancement-mode MOS FET T by the sum $V_{thT}+|V_{thT}'|$. With the horizontal scanning signals having a lowered high level, the burden on the horizontal scanning circuit can be reduced, and hence the power consumption can also be reduced.

APPLICABILITY FOR INDUSTRIAL USE

As described above, the solid state image pickup device according to the present invention can reduce the burden on the scanning circuit for turning on and off the switching elements which form the image pickup picture units on the image pickup surface and generate an image pickup signal output of good quality, and therefore is suitable for use in small-size, lightweight sophisticated television cameras.

We claim:

1. A solid state image pickup device comprising a p-type semiconductor substrate (8), an N-type well (21) formed in said substrate (8), first switching elements ($S_{11}'$ to $S_{mn}'$) arrayed in horizontal and vertical rows and each of said switching elements composed of P-channel insulated-gate field-effect transistors having two independent P-type regions comprising the drain (9') and the source (10') formed in said N-type well (21), said first switching elements in each vertical row having commonly connected terminals, a photoelectric conversion layer (17) disposed over the horizontal and vertical rows of said first switching elements ($S_{11}'$ to $S_{mn}'$) and electrically connected to other terminals of said first switching elements ($S_{11}'$ to $S_{mn}'$), a target electrode (18) on layer (17) and a plurality of second switching elements ($T_1$ to $T_n$) disposed respectively for the vertical rows of said first switching elements ($S_{11}'$ to $S_{mn}'$) and connected respectively to said commonly connected terminals of said first switching elements in the respective vertical rows, with the arrangement thereof wherein the horizontal rows of said first switching elements ($S_{11}'$ to $S_{mn}'$) are selectively energizable and said second switching elements ($T_1$ to $T_n$) are selectively energizable to deliver signals based on signal charges generated by said photoelectric transducer layer (17) through said first and second switching elements ($S_{11}'$ to $S_{mn}'$, $T_1$ to $T_n$) so as to produce an image pickup signal output.

2. A solid state image pickup device according to claim 1, wherein said plurality of P-channel insulated-gate field-effect transistors which constitute said first switching elements ($S_{11}'$ to $S_{mn}'$) have drains electrically connected to said photoelectric conversion layer (17), gates connected in common in the respective horizontal rows, and sources connected in common in the respective vertical rows and to the respective second switching elements ($T_1$ to $T_n$).

3. A solid state image pickup device according to claim 1 or 2, wherein said second switching elements ($T_1$ to $T_n$) are composed of a plurality of N-channel insulated-gate field-effect transistors.

4. A solid state image pickup device according to claim 2, wherein said second switching elements ($T_1$ to $T_n$) are composed of a plurality of N-channel insulated-gate field-effect transistors having sources connected respectively to the sources connected in common of the vertical rows of the pluraltiy of P-channel insulated-gate field-effect transistors which constitute said first switching elements ($S_{11}'$ to $S_{mn}'$), and their drains connected in common.

5. A solid state image pickup device according to claim 4, wherein said plurality of N-channel insulated-gate field-effect transistors which constitute said second switching elements ($T_1$ to $T_n$) are of the depletion type.

* * * * *